June 23, 1931.  C. A. BERGGREN  1,811,255
LIQUID SAMPLING DEVICE
Filed July 16, 1928
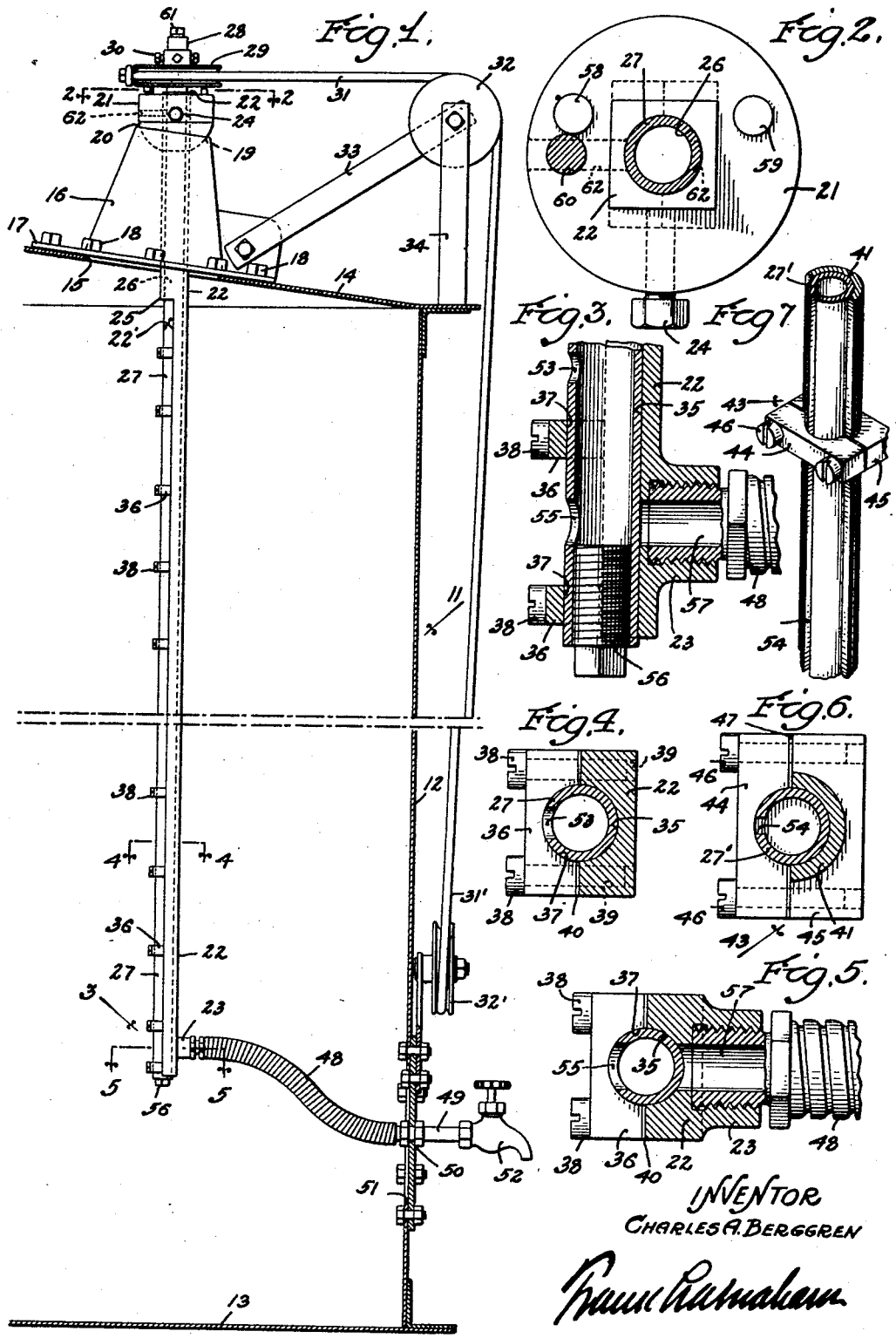
INVENTOR
CHARLES A. BERGGREN
ATTORNEY Patented June 23, 1931

1,811,255

UNITED STATES PATENT OFFICE

CHARLES A. BERGGREN, OF LOS ANGELES, CALIFORNIA, ASSIGNOR TO MORRIS B. PENDLETON, OF SAN GABRIEL, CALIFORNIA

LIQUID SAMPLING DEVICE

Application filed July 16, 1928. Serial No. 293,211.

This invention is a sampling device similar to that described in my co-pending application, Serial No. 293,210 which was filed July 16, 1928, for removing a small and uniform sample from storage tanks, such as are used in the storage of petroleum or similar liquids, and is particularly adapted for use in connection with liquids which are not of uniform composition and which tend to stratify after standing in such tanks.

Petroleum products, for instance, are stored in tanks of large capacity, and it is obviously necessary in determining the quantity and quality of the contents of such a tank to have convenient means whereby a uniform sample of the total contents may be readily obtained.

Various forms of so called "thieves" have been developed for this purpose, such thieves comprising containers which are lowered into the tank and by means of trip mechanism obtain a sample from various levels in the tank contents.

Other devices, in the way of tubes, etc., have been developed and one device which has met with varying success upon certain liquids is in the form of a slotted pipe and a slotted sleeve, provided with means for effecting relative rotation to bring the slots into and out of cooperative engagement.

This last mentioned device, which is perhaps the most practical so far developed, has one disadvantage in that it is difficult to accurately machine the two engaging surfaces of the tubular members to such a degree that there will be no leakage when the slots are in a so-called closed position.

It has been a primary object of this invention to develop a sampling device based somewhat upon the principle of the last above described construction, but which includes an improved form of sampling tube which may be readily adjusted throughout its length to provide a clearance of such fine adjustment that leakage, when the sampler is in a closed position, will be impossible.

This last mentioned object is accomplished by providing a central tubular member having a liquid admitting passage or passages formed in one side thereof with a segmental cylindrical bearing surface adapted to close the apertures upon a relative rotation between the bearing members. Clamping means are provided in a spaced relation throughout the length of the cooperating members.

The clamping means may be provided with shims or other suitable adjusting devices, permitting the two members to be drawn to within one-thousandth of an inch clearance, such clearance being sufficient only to permit a relative rotation between members and to prevent the entrance or admission of oil or other liquid between the two members.

The gauging or measuring of the depth of liquids in tanks of the class mentioned above, as generally practiced, is carried out by suspending a graduated tape having a weight or plumb bob on the lower end thereof, into the tank and noting the upper level of the liquid on the tape. Such practice requires an operator to climb to the tank roof, and is attended by a certain danger of fire which may result from the metal tape or weight striking metal members on the tank roof.

Another feature of this invention is, therefore, the development of a new method of measuring the depth of liquid in such tanks by means of sampling tubes of the class described.

It will be apparent that knowing the total volume and the sectional area of the sampling tube, the length of tube corresponding to the volume at any point may be readily calculated, and curves or charts may be prepared from which the depth of oil corresponding to any volume of sample may be immediately determined.

This method of gauging avoids the discrepancy resulting from a "bending" or "tilting" of a gauge tape, it eliminates the necessity of an operator climbing to the tank roof, and obviates the mentioned danger from fire. The invention provides a device whereby a uniform sample and an accurate measurement of the depth of liquid in the tank may be obtained in a single operation.

Other objects and advantages of this invention will be better understood from a detailed description of an illustrated embodiment thereof, such as is shown in the accompanying drawings, in which Fig. 1 shows a section of a tank having a sampling device mounted therein.

Fig. 2 is a plan section, taken substantially along the line 2—2 of Fig. 1.

Fig. 3 is an elevational section of the lower end of the sampling tube, such as is used in combination with this invention and may be considered as an enlarged sectional view of that portion of Fig. 1 which is indicated by the arrow 3.

Fig. 4 is an enlarged sectional view, taken substantially along the line 4—4 of Fig. 1.

Fig. 5 is an enlarged sectional view, taken substantially along the line 5—5 of Fig. 1.

Fig. 6 is an enlarged sectional view corresponding somewhat to Fig. 4, but showing a modified form of segmental sleeve and pipe organization.

Fig. 7 is a perspective view, showing a modified form of my invention as shown in Fig. 6.

More particularly describing the invention as herein illustrated, reference numeral 11 indicates a tank having a side 12, a bottom 13 and a top 14. The top 14 is provided with a suitable aperture 15 over which a sample supporting housing 16 is mounted upon the tank roof, being supported thereon by means of a flange 17 and bolts 18.

The housing 16 is upwardly provided with a bearing surface 19 which receives a lower bearing surface 20 upon a head member 21, and the head member 21 is adapted to receive a substantially rectangular segmental sleeve or bearing member 22, which extends downwardly therethrough and terminates in an outlet T-fitting 23.

The segmental sleeve or bearing member is retained within the mentioned head member by any suitable means, such as the set screw 24, and the T-fitting 23 may be integrally formed, as shown in Fig. 3, upon the so-called sleeve member or may be separately attached thereto in any suitable manner.

It will be understood that the upper section 25 of the sleeve member 22 is provided with a cylindrical passage 26, which receives the upper end of a sampling tube 27. This sampling tube extends upwardly through the bearing member 20, and an outer end 28 thereof is provided with suitable turning means such as the wheel 29, which may be retained thereon by means of the set screws 30. The wheel 29 is provided with any operating means such as the cable 31, which extends over a suitably supported pulley 32 in a manner such that a lower end 31 thereof will be accessible to an operator upon the ground.

The pulley 32 is supported by means of an angularly extending standard 33, which is pivoted to the housing 16, and a downwardly extending leg 34, which engages the outer periphery of the tank top 14.

The lower end 31' of the cable may be received by a suitably supported pulley 32' such as is illustrated in Fig. 1.

That portion of the sleeve member 22 which extends below the tank top, such portion being indicated by reference numeral 22', is machined or otherwise formed in a manner which provides a segmental cylindrical bearing surface 35, within which the tubular member 27 is adapted to rotate. The tubular member 27 is held in an adjusted rotatable engagement with this surface by means of a plurality of clamp members indicated at 36, such clamp members being provided with an inner cylindrical surface 37, and retained upon the sleeve member 22 by means of screws 38, which are received in threaded apertures 39, in the outer edges of the sleeve or bearing member 22 and in which a spaced adjustment may be provided by means such as shims indicated by reference numeral 40.

In the modified form of my invention shown in Figs. 6 and 7, the sleeve member is shown as comprising a segmental tubular member 41 rather than a rectangular member as described above and the tubular section 41 is maintained in an adjusted engagement with the sampling tube 27' by means of a plurality of clamps shown as comprising sections 44 and 45, the sections being retained in engagement by means such as the screws 46, adjustment optionally being effected by means of the shims 47.

The sections 45 which are carried by the sleeve member 41 may be retained against lateral displacement thereon in any preferred manner such as welding.

The lower T-fitting 23 heretofore mentioned as being provided upon the lower end of the so-called sleeve member 22 is adapted to receive a flexible tube 48, the outer end of which is connected to a pipe 49, which passes through a packing gland 50 in a man hole 51 mounted upon the side 12 of the tank 11 and with any suitable means of sampling valve, such as is indicated at 52.

In order that a substantially uniform sample may be admitted to the sampling tube 27, this tube is provided with a plurality of apertures such as are indicated at 53, these apertures being arranged in a uniformly spaced relation and on a substantially straight line throughout the length of the tube. It will be understood that the spacing and sectional area of these apertures will be governed largely by the viscosity, density and depth of the liquid in which the device is being used and if desired, a laterally extending slot 54 might be provided throughout the entire length of the tube, which slot would insure a uniform sample in case the device were being used in a very heavy or viscous liquid, such a slot is shown in Figs. 6 and 7.

An outlet aperture 55 is provided in the bottom of the tube above a suitable closed plug 56, and it will be apparent that by turning the sampling tube through substantially 180° from the position shown in Figs. 3 to 5, inclusive that the sample admitting apertures 53 will be closed by the sleeve section 22 and the outlet opening 55 will be in line with an outlet passage 57 in the T-fitting 23, permitting the withdrawal of the sample through the flexible member 48 and the valved outlet 52.

In order that the rotation of the sampling tube may be limited to substantially 180° or the movement necessary to permit an opening and closing of the apertures 53 and a corresponding closing and opening of the outlet passage 57, the bearing member 21 may be provided with a pair of oppositely disposed and upwardly extending projections 58 and 59, and the sampling tube actuating wheel 29 may be provided with a correspondingly positioned and downwardly extending projection 60, which is adapted to engage the tube bearing supported projections in the two positions of movement of the sampling tube.

The upper end of the sampling tube 27 may be provided with a threaded closed plug 61 and may be additionally provided with vent means such as are indicated in the dotted lines at 62.

I claim as my invention:

1. A liquid sampling device, for use in combination with a tank, which comprises: a bearing sleeve member suspended in said tank and having a segmental cylindrical inner surface; a sampling tube rotatably mounted in said bearing sleeve, one side of said tube being adapted to admit the passage of liquid into said tube; means for adjustably holding said sampling tube in sliding contact with said sleeve; means for rotating said sampling tube; and means for withdrawing liquid from said tube.

2. A liquid sampling device, for use in combination with a tank, which comprises: a bearing sleeve member suspended in said tank and having a segmental cylindrical inner surface; a sampling tube rotatably mounted in said bearing sleeve, one side of said tube being adapted to admit the passage of liquid into said tube; means for adjustably holding said sampling tube in sliding contact with said sleeve; means for rotating said sampling tube; and means comprising an outlet in the lower end of said bearing sleeve member for withdrawing liquid from said tube.

3. A liquid sampling device, for use in combination with a tank, which comprises: a bearing sleeve member suspended in said tank and having a segmental cylindrical inner surface; a sampling tube rotatably mounted in said bearing sleeve, one side of said tube being adapted to admit the passage of liquid into said tube; means comprising a plurality of clamps mounted on said sleeve member in engagement with said sampling tube for holding said sampling tube in sliding contact with said sleeve; means for rotating said sampling tube; and means for withdrawing liquid from said tube.

4. A liquid sampling device, for use in combination with a tank, which comprises: a substantially rectangular bearing sleeve member suspended in said tank and having a segmental cylindrical inner surface; a sampling tube rotatably mounted in said bearing sleeve, one side of said tube being adapted to admit the passage of liquid into said tube; means for holding said sampling tube in sliding contact with said sleeve; means for rotating said sampling tube; and means for withdrawing liquid from said tube.

5. A liquid sampling device, for use in combination with a tank, which comprises: a substantially fixed bearing sleeve member suspended in said tank and having a segmental cylindrical inner surface; a sampling tube in rotatable engagement with said inner surface, said sampling tube having a plurality of liquid admitting apertures on one side thereof and said segmental sleeve member being adapted to close said apertures during a partial rotation of said sampling tube; means for rotating said sampling tube; and means for withdrawing liquid from said sampling tube, said sleeve member being substantially rectangular in cross sectional outline and provided with a plurality of clamps adapted to hold said sampling tube in sliding engagement therewith.

6. A liquid sampling device, for use in combination with a tank, which comprises: a bearing sleeve member suspended in said tank and having a segmental cylindrical inner surface; a sampling tube rotatably mounted in said bearing sleeve, one side of said tube being adapted to admit the passage of liquid into said tube; means for adjustably holding said sampling tube in sliding contact with said sleeve; means for effecting relative rotation between said sampling tube and said sleeve.

7. A liquid sampling device, for use in combination with a tank, which comprises: a bearing sleeve member suspended in said tank and having a segmental cylindrical inner surface; a sampling tube rotatably mounted in said bearing sleeve, one side of said tube being adapted to admit the passage of liquid into said tube; means for adjustably holding said sampling tube in sliding contact with said sleeve; means for effecting relative rotation between said sampling tube and said sleeve, and means for withdrawing liquid from said tube.

In testimony whereof, I have hereunto set my hand at Los Angeles, California, this 13th day of June, 1928.

CHARLES A. BERGGREN.